May 26, 1970  HIROMU SOGA  3,514,703
METHOD FOR MEASURING THE CONFIGURATION OR THICKNESS OF
A MOVING METAL BODY BY MICROWAVE RESONATORS
Filed Feb. 3, 1967  6 Sheets-Sheet 1

INVENTOR
Hiromu Soga,

BY Wenderoth, Lind and Ponack,
ATTORNEYS

United States Patent Office 3,514,703
Patented May 26, 1970

3,514,703
METHOD FOR MEASURING THE CONFIGURATION OR THICKNESS OF A MOVING METAL BODY BY MICROWAVE RESONATORS
Hiromu Soga, Kawasaki, Japan, assignor to Yawata Iron & Steel Co., Ltd., Tokyo, Japan
Filed Feb. 3, 1967, Ser. No. 613,959
Claims priority, application Japan, Feb. 10, 1966, 41/7,857; Mar. 29, 1966, 41/19,470, 41/19,471; Aug. 2, 1966, 41/50,706
Int. Cl. G01r 27/04
U.S. Cl. 324—58.5        8 Claims

ABSTRACT OF THE DISCLOSURE

A method for measuring the configuration or thickness of a running metal body without contacting it with any measuring equipment. One or a plurality of one-end-open cylindrical resonant cavities is directed toward the surface of the metal body while keeping it spaced therefrom. Microwaves are applied to the cavity or cavities and the frequency at which the cavity or cavities are resonant is detected. This is used to determine the spacing of the cavity from the body from the known relationship between the resonant frequency and the spacing.

---

The present invention relates in general to a method of measuring the configuration or thickness of a metal body and more particularly to a method of measuring or detecting the configuration or thickness of a metal body such as an iron plate by using microwaves without bringing anything into contact with the metal body.

When manufacturing or working a metal body such as an iron plate, it is generally a matter of great importance in view of product control and economy to detect or measure the surface contour or thickness of the metal body. For the measurement, the simplest thing is to bring a scale or another gauge into contact with the metal body; however, when the metal body has a very high temperature or is a thin plate moving at a high speed, the contact itself is extremely difficult. Furthermore, if the metal body varies in configuration or thickness while moving, the measurement is more difficult and can hardly be carried out with high precision.

An object of the present invention is to provide a method for measuring the configuration or thickness of a metal body having a high temperature or a metal body such as an iron plate moving at a high speed, continuously and with high precision while not touching the metal body.

Another object of the present invention is to provide a method of measuring the configuration or thickness of a metal body which has a high temperature or, for example, an iron plate moving at a high speed, by using one or more one-end-open cylindrical microwave resonant cavities in one of various manners.

Other objects and advantages of the present invention may be best understood by reference to the following description and the appended claims, when read in conjunction with the accompanying drawings, in which:

FIGS. 16(a), (b) and (c) and 17(a), (b) and (c) are schematically illustrative of the detection and phase detection of the resonance point;

FIGS. 18(a) and (b) are graphs illustrative of another technique embodying the present invention for measuring the thickness of a metal plate.

The present invention contemplates detecting the configuration of a metal body with high precision without making anything to touch the metal body.

Figure 1:
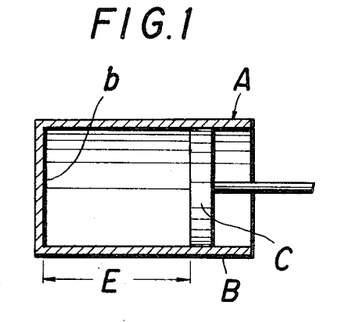
FIG. 1 is a vertical section of a prior typical microwave frequency measurement resonant cavity.
Figure 2:
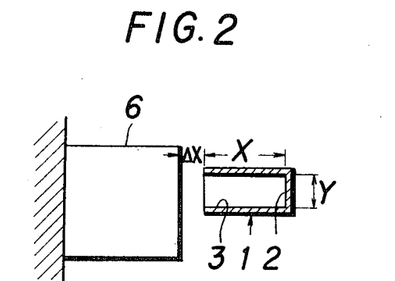
FIG. 2 is a vertical section showing a one-end-open cylindrical resonant cavity to be employed in the method of the present invention.
Figure 3:
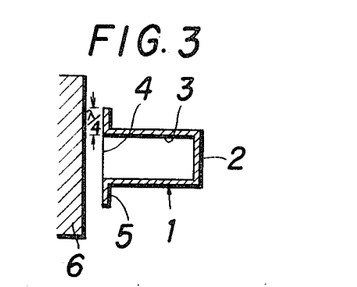
FIG. 3 is a vertical section showing another one-end-open cylindrical resonant cavity designed in accordance with the present invention.

Referring now to the drawings, a cylindrical microwave resonant cavity one end of which is open as shown in FIG. 2 or 3 is used for practicing the present invention. The one-end-open cylindrical resonant cavity 1 shown in FIG. 2 consists of a bottom wall 2 and a side wall 3, while the resonant cavity 1 shown in FIG. 3 comprises a bottom wall 2, a side wall 3 and a flange 5 connected to the open-end edge 4 of the side wall 3 so as to be substantially perpendicular to the side wall 3, that is, parallel to the bottom wall 2. A resonant cavity A as shown in FIG. 1 has so far been known as a means for microwave frequency measurement. Unlike the one-end-open cylindrical microwave resonant cavity 1 shown in FIGS. 2 and 3, the prior resonant cavity A shown in FIG. 1 consists of a one-end-open cylinder B and a plunger C received by the cylinder B. While microwaves whose frequency is to be measured are applied to the cylinder B, the plunger C is shifted until the resonant cavity A resonates with the microwaves, and the distance E between the inner surface of the plunger C and that of the bottom wall D is measured. Then, the frequency of the microwaves is found by referring to the relation previously known between the distance E and the frequency. In short, with the prior resonant cavity A for microwave frequency measurement, the resonant frequency is obtained by measuring the distance E. On the other hand, the one-end-open cylindrical resonant cavity 1 of the present invention is not equipped with such a plunger as mentioned above. The resonant cavity 1, when in use, is placed near a metal body 6 the configuration or thickness of which is to be measured, with the open end thereof facing the metal body 6. With the resonant cavity 1 thus positioned, the microwave resonant frequency is measured to find the distance $\Delta x$ between the resonant cavity 1 and the metal body 6. Accordingly, if the metal body 6 to be subjected to measurement is heated to expand, it is possible, by measuring the distance $\Delta x$ between the resonant cavity 1 and the metal body 6 before and after heating to detect the change in the configuration of the metal body 6 and also to find the expansion coefficient of the metal body 6.

Besides, the thickness of a metal body 6 can be ascertained by spacing two such one-end-open cylindrical resonant cavities 1 as mentioned above from the opposite sides of the metal plate 6 keeping the distance between the open sides of these resonant cavities constant and detecting the each distance $\Delta x$ between the metal plate 6 and each of the cylindrical resonant cavities 1.

Figure 4:
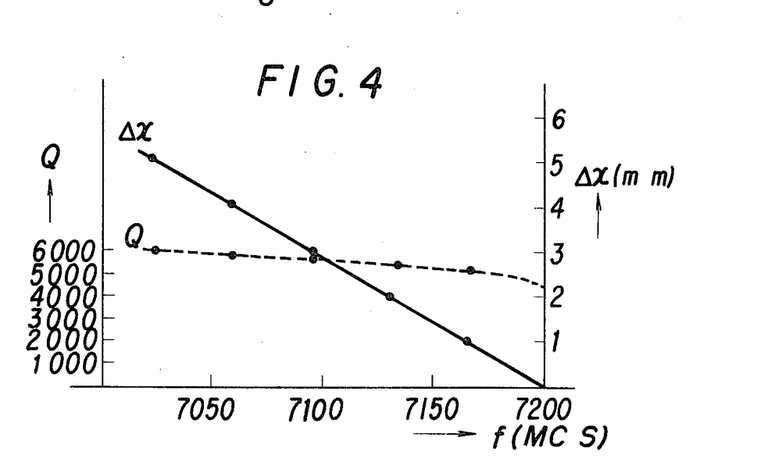
FIG. 4 illustrates the frequency characteristic of the one-end-open cylindrical resonance cavity actually measured by means of the resonator shown in FIG. 2 and measured Q values.

In the present invention, it has been found that there is a relation between the distance $\Delta x$ from the one-end-open cylindrical resonant cavity 1 to the metal body 6 and the resonant frequency of the resonant cavity 1, the relation being different from that found between the distance E from the inner surface of the plunger C of the prior resonant cavity A to the bottom D and the resonance frequency. The relation between the distance $\Delta x$ in mm. and the resonance frequency "$f$" (mc./s.) is rectilinear as indicated by the solid line in FIG. 4, which shows the result of an experiment carried out with the use of a lead plate as the measuring metal body 6 and a one-end-open cylindrical resonant cavity 1 made of brass, 93.795 mm. in length (X) and 68 mm. in inside diameter (Y). The dotted line in the figure represents the resonance sharpness Q. The choke flange 5 shown in FIG. 3 is provided to prevent the leakage of the resonant microwave power from the cylindrical resonant cavity 1. Accordingly, the flange 5 should be designed to have, as shown in FIG. 3, a length of $\lambda/4$, where $\lambda$ denotes the wave length corresponding to the resonant frequency, $f$.

Figure 5:
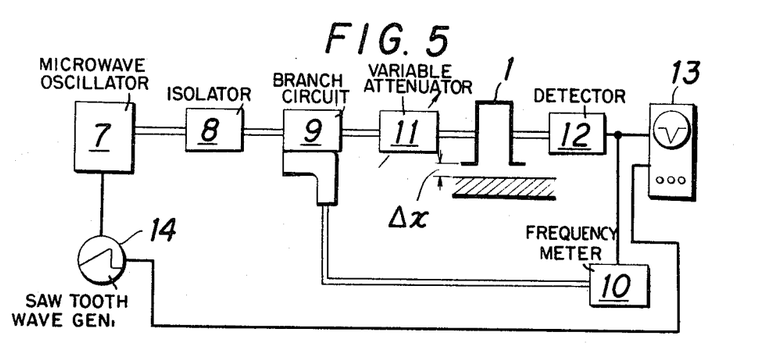
FIG. 5 is a block diagram of a typical system for measuring the resonant frequency.

In order to measure the resonant frequency a prior ordinary microwave measuring system may be used as it is. A typical measuring arrangement employed in the present invention is as shown in FIG. 5. The reference numeral 7 designates a microwave oscillator, the output of which passes through an isolator 8 to a branch circuit 9. A minor part of the microwave energy having entered the branch circuit 9 proceeds to a frequency meter 10, while the remaining major part is attenuated by a variable attenuator 11 to an adequate intensity and thereafter applied to a one-end-open transmission type cylindrical resonant cavity 1. When the resonant cavity 1 does not resonate with the applied frequency, the energy is fed, as it is, to a detector 12. The detected signal is led to an oscilloscope 13 and a frequency meter 10. The numeral 14 refers to a device which changes the frequency of the output of the oscillator 7 in the form of a saw tooth to locate the resonance point. Since the microwave frequency is thus changed, the output of the detector 12 decreases when the frequency with which the cylindrical resonant cavity resonates reaches the resonator. At the time, the output wave form on the oscilloscope has a dip as illustrated in the figure. Therefore, by measuring the frequency at the dip by means of the frequency meter 10, the resonant frequency can be ascertained, and accordingly the distance $\Delta x$ shown in the figure can be exactly known.

It is, of course, possible in practicing the present invention to use any other means for measurement of the resonant frequency. Frequency measurement is now known to be extremely high in accuracy. This invention will be further explained in conjunction with some embodiments thereof.

Figure 6:
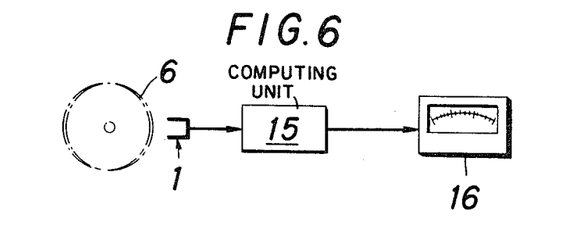
FIG. 6 schematically illustrates a system employed for detecting the configuration of a roll according to the present invention.

FIG. 6 shows an arrangement for detecting the configuration of such a metal body 6 as a roll. A one-end-open cylindrical resonant cavity 1 is spaced an adequate distance from the metal body 6 and connected to an operating or computing unit 15, which in turn connected to a indicating unit 16, so that the distance $\Delta x$ can be displayed by the indicating unit 16. If an eccentric roll is subjected to configuration measurement, the distance $\Delta x$ will change, causing the needle of the indicating unit to swing. Thus, not only the configuration of the roll but also the variation of the configuration due to heating can be detected.

Figure 7:
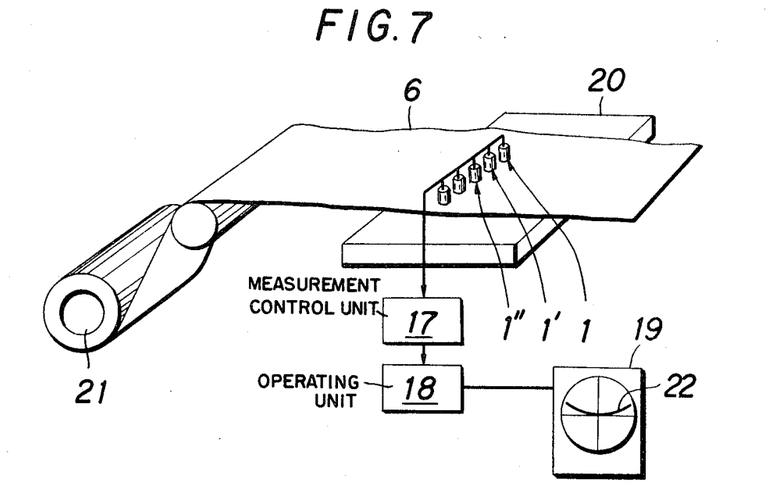
FIG. 7 is a schematic illustration of a system for detecting the contours of a wavy metal plate according to this invention.

In the system illustrated in FIG. 7, the metal body under study is a steel plate, and a plurality of one-end-open cylindrical resonant cavities 1, 1', 1", . . . are spaced from the steel plate in a row in the direction of the width of the steel plate. The cylindrical resonant cavities 1, 1', 1", . . . are connected to a measurement control unit 17, an operating unit 18 and an indicating unit 19 which are linked in series in the named order. The steel plate is moved on a surface plate 20 which serves as a flatness standard, by driving a take-up shaft 21. Thus, by measuring the wave height and wave length in relation to the curvature of the steel plate, the configuration can be detected. The distance between the steel plate and each of the cylindrical resonant cavities 1, 1', 1", . . . is displayed on the cathode ray tube as indicated by the numeral 22 in the figure so that the shape of the steel plate is directly visible.

In each of the above described systems, the configuration of the metal body 6 is studied from one side thereof. However, when one-end-open cylindrical resonant cavities are placed on both sides of the metal body 6 under study, the configuration measurement is not limited to surface observation but can be extended to three-dimensional measurement, as will be seen in the following examples.

Figure 8:
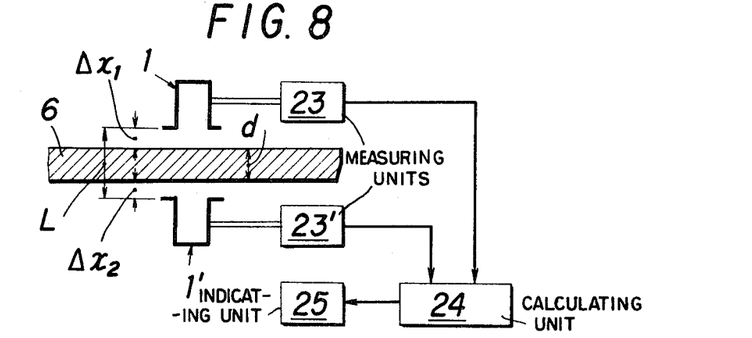
FIG. 8 is a schematic illustration of a system for measuring the thickness of a metal plate according to this invention.

In the exemplary arrangement shown in FIG. 8, the metal body 6 under study is a metal plate the thickness of which is to be examined. A pair of one-end-open cylindrical resonant cavities 1 and 1' are spaced from the metal body 6 on the opposite sides of the latter, with a constant distance L kept between the resonant cavities 1 and 1'. The distances $\Delta x_1$ and $\Delta x_2$ on both sides of the metal body 6 are measured by means of measuring units 23 and 23'. The result is given to a calculating unit 24, which calculates according to the formula $$d = L - (\Delta x_1 + \Delta x_2)$$

where "$d$" stands for the thickness of the metal body 6. Therefore it is possible to make the thickness "$d$" appear on an indicating unit 25. Thus, a cubic configuration measurement can be accomplished.

Figure 9:
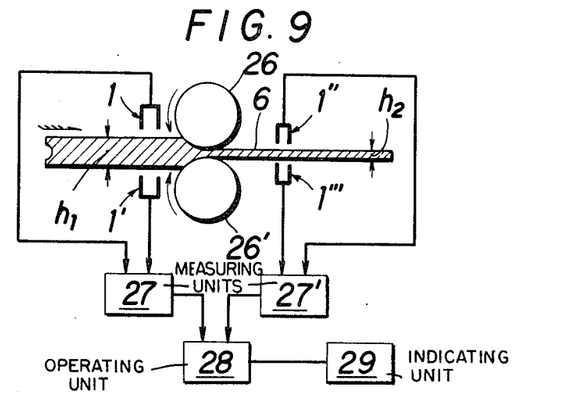
FIG. 9 is a schematic illustration of a system for measuring the reduction rate or the like utilizing the system illustrated in FIG. 8.
Figure 10:
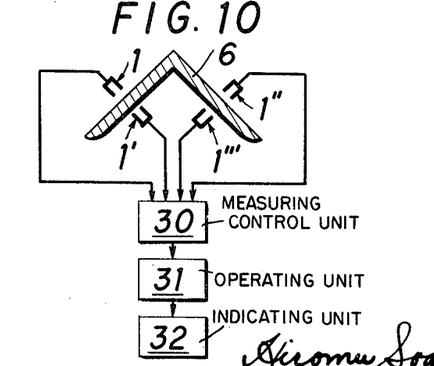
FIG. 10 is a schematic illustration of a system for detecting the configuration of an angle.
Figure 11:
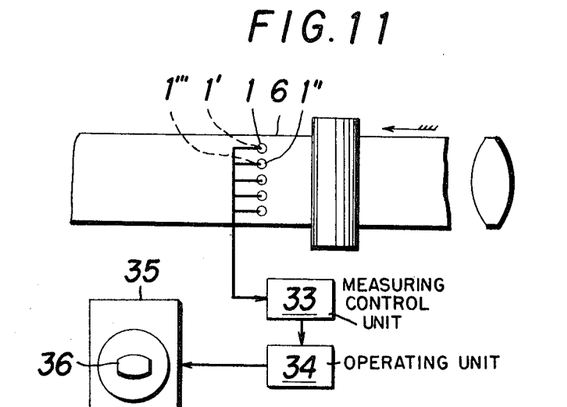
FIGS. 11 and 12 are schematic illustrations of measuring systems embodying the present invention to be used for detection of the crown of rolled steel plate.
Figure 12:
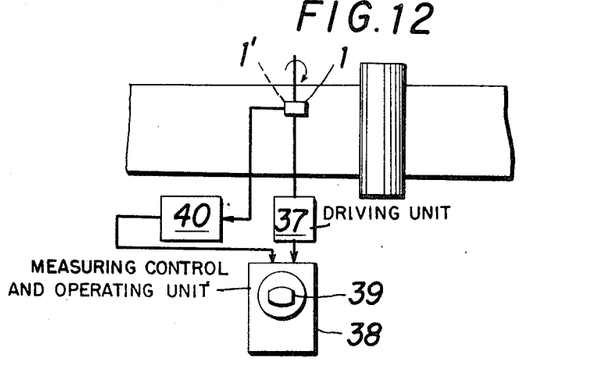

Another exemplary arrangement for practicing the above-mentioned cubic measurement technique is illustrated in FIG. 9. The arrangement is useful for measuring the reduction ratio of an iron plate or the like. The reference numerals 26 and 26' denote rollers. The numerals 1 and 1', 1" and 1"' stand for two pairs of one-end-open cylindrical resonant cavities spaced from a metal body so as to allow a pair of measuring units 27 and 27' to detect the thickness $h_1$ and $h_2$ of the metal body before and after the rolling thereof respectively. The reduction ratio, $(h_1-h_2)/h_1$, is computed by an operating unit 28 and indicated by an indicating unit 29. It will be apparent from the above that, by employing the method of this invention to detect the thickness of a metal body before and after rolling, the reduction ratio can be easily measured. In the arrangement illustrated in FIG. 10, the metal body 6 under study is an equal angle. The numerals 30, 31 and 32 denote a measuring control unit, an operating unit and an indicating unit respectively. By using two pairs of one-end-open cylindrical resonant cavities 1 and 1', 1" and 1"', the thickness of the equal angle can be measured while the steel is hot. In the system shown in FIG. 11, the metal body 6 under study is a hot-rolled sheet. This system can be used for diagrammatic display of the crown of the hot-rolled sheet. A desired number of pairs of one-end-open cylindrical resonant cavities 1 and 1', 1" and 1"', . . . are lined up and spaced apart from both sides of the sheet in the direction of the width of the sheet. The crown of the sheet between each pair of cylindrical resonant cavities is displayed as a visible pattern by the indicating unit 35 through a measuring control unit 33 and an operating unit 34, so that the cross-sectional contour 36 of the steel plate appears as seen in the figure. FIG. 12 illustrates a system which employs, instead of such pairs of one-end-open cylindrical resonant cavities as shown in FIG. 11, a pair of movable cylindrical resonant cavities 1 and 1' by a driving unit 37 to scan the sheet in the width direction, thereby causing the cross-sectional contour 39 of the sheet to appear on a display unit 38 in the same manner as in the preceding arrangement.

Each of the one-end-open cylindrical resonant cavities 1 employed in the above described systems is as seen in FIG. 3, that is, has a flange 5 as shown in FIG. 3.

Figure 13:
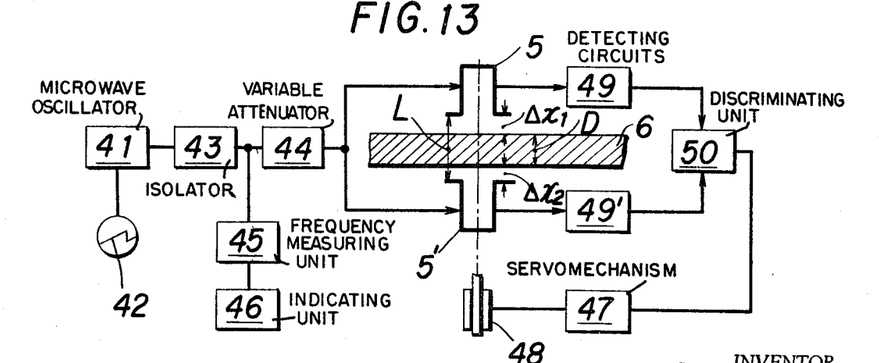
FIG. 13 is a schematic illustration of a system for measuring the thickness of a metal plate according to the invention.
Figure 14:
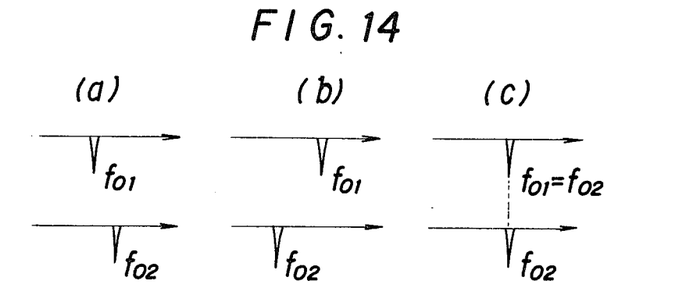
FIG. 14 schematically illustrates the difference between the resonance points in the arrangement illustrated in FIG. 13.

FIGS. 13 and 14 illustrate the formation and operation of an exemplary improved system designed for measuring the thickness of a metal plate according to the present invention. In the system, a pair of flanged cylindrical resonant cavities (hereinafter denoted by the numerals 5 and 5') are spaced from the opposite sides of the metal body 6 under study by distances $\Delta x_1$ and $\Delta x_2$ and separated from each other by a distance L. The cylindrical resonant cavities 5 and 5' are shifted so as to keep the distance $\Delta x_1$ and $\Delta x_2$ equal, thereby enabling the thickness of the metal body 6 to be measured swiftly and accurately. More particularly, the system includes a microwave oscillator 41, an isolator 43, a variable attenuator 44, a frequency measuring unit 45 and an operating and indicating unit 46, all of which are conventional units available for microwave frequency measurement. A modulation voltage in a saw tooth wave form 42 is applied to the microwave oscillator 41. Therefore, the oscillation frequency of the oscillator 41 varies in a saw tooth pattern within a range. The microwave output power subjected to such frequency modulation passes through the isolator 43 and is attenuated to an adequate intensity by the variable attenuator 44 and then divided in two parts, which are fed to the cylindrical resonant cavities 5 and 5' each opened and flanged at one end. The frequency measuring unit 45 is connected to the output of the isolator 43 and also to the operating and indicating unit 46.

The flanged cylindrical resonant cavities 5 and 5' are separated from both sides of the metal body 6 with the flanged open ends directed toward the metal body 6 as shown in the FIG. 14. The cylindrical resonant cavities 5 and 5' are interlocked so as to be moved together in the direction of the thickness D of the metal body 6 (in the vertical direction in the drawing), while holding the specified distance L between the flanged open ends. The movement of the cylindrical resonant cavities 5 and 5' is caused by an actuator 48 driven by a servomechanism 47. A pair of detecting circuits 49 and 49' are connected to the outputs of the cylindrical resonant cavities 5 and 5'. The signals produced by the detecting circuits 49 and 49' are applied to a discriminator unit 50. The difference signal from the unit 50 actuates the servomechanism 47 so as result in a zero difference signal.

In this arrangement, therefore, microwaves which change in frequency within the specified range can be applied to the cylindrical resonant cavities 5 and 5'. The distances $\Delta x_1$ and $\Delta x_2$ from the metal body 6 to the open ends of the resonant cavities 5 and 5' are determined by the resonant frequencies $fo_1$ and $fo_2$ of the resonant cavities 5 and 5' respectively. Accordingly, when the microwaves having the resonant frequencies $fo_1$ and $fo_2$ reach the cylindrical resonant cavities 5 and 5' respectively, the output signals of the detecting circuits 49 and 49' are as shown in FIG. 14, where the abscissa is the change of the oscillator frequency with time. The discriminator unit 50 discriminates the phase of the outputs of the detecting circuits 49 and 49'. At (c) in FIG. 13, the resonant frequencies $fo_1$ and $fo_2$ are equal to each other, that is, the distances $\Delta x_1$ and $\Delta x_2$ are equal. At (a) and (b), $fo_1$ is different from $fo_2$, and hence $\Delta x_1$ is different from $\Delta x_2$. At the time of (c), the difference signal to be applied to the servomechanism 47 from the discriminator unit (50) is zero. At the time of (a) or (b), there occurs a positive or negative difference between the resonance frequencies $fo_1$ and $fo_2$, and the signal causes the actuator 48 linked with the servomechanism 47 to actuate the interlocked cylindrical resonant cavities 5 and 5' to move vertically until the distance $\Delta x_1$ and $\Delta x_2$ become equal. Thus, the position of the resonant cavities 5 and 5' is always automatically controlled so that $\Delta x_1$ remains equal to $\Delta x_2$. The resonant frequency $fo_1 = fo_2$ is detected by the frequency measuring unit 45. Hence, the distance $\Delta x_1 = \Delta x_2$, which has a relation with the frequency, can be known. The operating and indicating unit 46 is adapted to calculate the thickness of the metal body 6, which is expressed by the formula $D = L - (\Delta x_1 + \Delta x_2) = L - 2\Delta x_1$.

Although the resonance points are detected by saw tooth microwave modulation technique and made equal by automatic control, it is also possible to equalize the resonance points by modulating the microwaves infinitesimally by means of an adequate sinsoidal frequency before feeding the microwave power to the cylindrical resonant cavities and phase-detecting the output signals. As the servomechanism, an electric, pneumatic or hydraulic mechanism or a combination thereof may be employed according to the variation in the thickness of the metal body under study with time, the period of the vertical motion of the metal body, and so on. The microwave oscillator may be any type of oscillator the oscillation frequency of which is variable about the resonant frequencies. However, a klystron, a magnetron, a backward tube oscillator, a semiconductor oscillator or the like is especially suitable for the purpose. The distance L between the cylindrical resonant cavities can be adequately adjusted according to the thickness D of the metal body. In the present embodiment of this invention, there is provided a pair of one-end-open cylindrical resonant cavities spaced from the opposite sides of the metal body under study with the open ends facing the metal body, as already mentioned. Therefore, the system is suitable for use when it is difficult to bring any measuring means into contact with the metal body under study because of the high temperature, when the metal body is running, when any contact should be avoided, when the metal body is vibrating in the vertical direction, the thickness thereof is changing, and so forth. Moreover, when subjected to high temperature, the one-end-open cylindrical resonant cavities can be cooled so as to be free from errors due to thermal deformation.

In the exemplary arrangement shown in FIG. 13, in which the resonance points of the cylindrical resonant cavities are automatically controlled to be always equal to each other. It is therefore possible to avoid such troublesome procedures as measuring the resonant frequencies $fo_1$ and $fo_2$ of the cylindrical resonant cavities separately, determining the distances $\Delta x_1$ and $\Delta x_2$ from $fo_1$ and $fo_2$, and computing the thickness $$D = L - (\Delta x_1 + \Delta x_2)$$

Only the measurement of the frequency $fo_1 = fo_2$ is necessary to work out the distance $\Delta x_1 = \Delta x_2$, which is of course a single value, and the calculation according to the formula $D = L - 2\Delta x_1$ gives the thickness D directly, swiftly and accurately.

Figure 15:
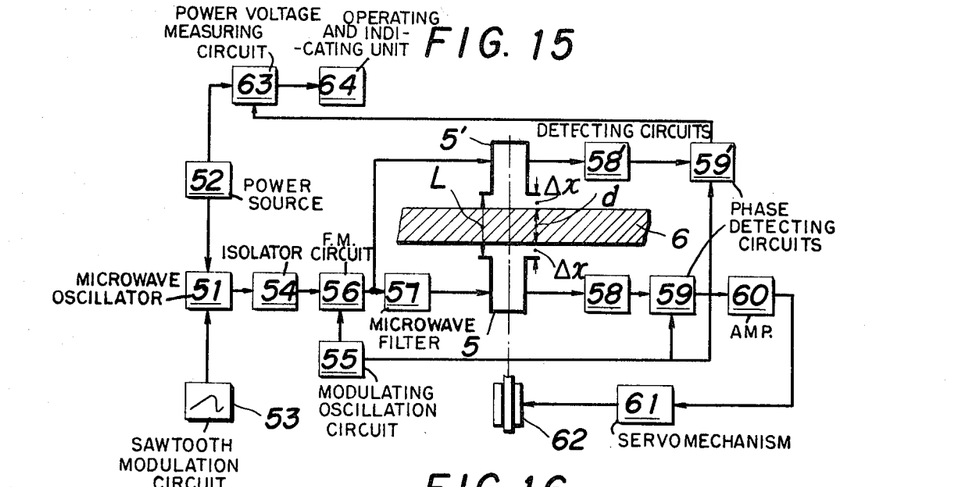
FIG. 15 is a schematic illustration of another system for measuring the thickness of a metal plate.
Figure 16:
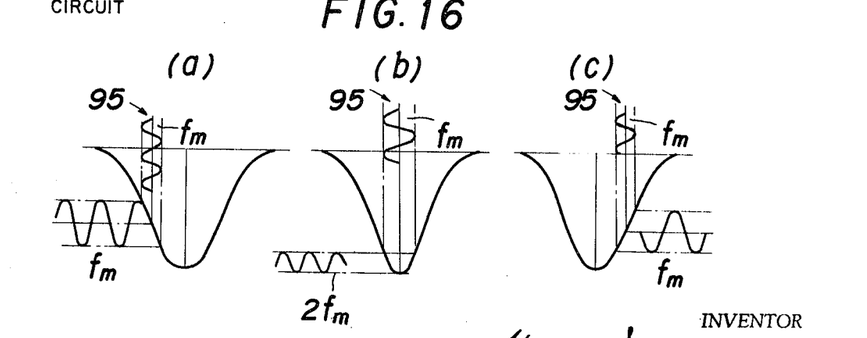

FIGS. 15 and 16 illustrate the formation and operation of another exemplary improved system designed for measuring the thickness of a metal plate according to the present invention. In the system, a pair of flanged cylindrical resonant cavities 5 and 5' are spaced from the opposite sides of the metal body 6 under study by distances $\Delta x_1$ and $\Delta x_2$ and separated from each other by a distance L. The cylindrical resonant cavities 5 and 5' are shifted so as to keep one of the distances $\Delta x_1$ and $\Delta x_2$ constant, and the resonance frequency of the resonant cavities corresponding to the other one of said distances is also measured at the same time, so that the thickness of the metal body 6 can be measured swiftly and accurately. This will be explained more particularly by referring to the figures. DC electric power is supplied from a power source 52 to a microwave oscillator 51, which also receives a modulation signal from a saw tooth modulation circuit 53. Therefore, the oscillation frequency at the output of the oscillator 51 varies in a saw tooth pattern within a range. The microwave output power passes through an isolator 54 and through an infinitesimal frequency modulation circuit 56 connected to a modulating oscillation circuit 55. Thereafter, the microwave output power is divided into two parts. One of the parts passes through a microwave filter 57 to the cylindrical resonant cavity 5 opened and flanged at one end thereof, while the other part proceeds to the other cylindrical resonant cavity 5' separated by the distance L from the resonant cavity 5 and linked with the latter so as to be movable together. Accordingly, the resonant cavity 5 receives only a filtered frequency. The reference numerals 58 and 58' designate detecting circuits connected to the resonant cavities 5 and 5' respectively, and the numerals 59 and 59' designate phase-detecting circuits linked with the detecting circuits 58 and 58' respectively. The output of the phase detecting circuit 59 is transmitted through an amplifier 60 to a servomechanism 61. An actuator 62 is driven by the output of the device 61 to move the interlocked cylindrical resonant cavities 5 and 5' in the vertical direction. The output of the phase detecting circuit 59' is supplied to a power voltage measuring circuit 63 connected to the power source 52. The circuit 63 is connected to an operating and indicating unit 64. The open ends of the cylindrical resonant cavities 5 and 5' separated from the opposite sides of the metal body 6 face the metal body as illustrated in FIG. 15.

Figure 17:
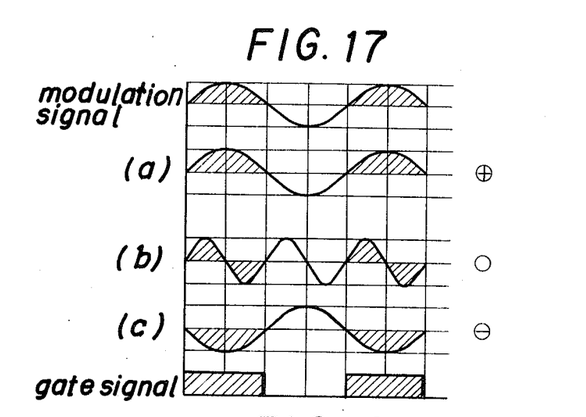

In this arrangement, therefore, the microwaves of a constant frequency are fed from the filter 57 to the cylindrical resonant cavity 5. The frequency of the modulation signal 95 produced by the frequency modulation circuit 56 is represented by "FM" in FIG. 16. When the cylindrical resonant cavity 5 resonates with the constant microwave frequency from the filter 57, the output frequency of the detecting circuit 59 is 2 FM as shown at b in the figure. When the resonant cavity 5 does not resonate, the output frequency of the detecting circuit 59 is FM as seen at a or c. Since the output varies according to one of the three cases a, b and c, it is possible to discriminate among the cases a, b and c by the use of the phase detecting circuit 59. More particularly, by carrying out detection and rectification using a gate signal of the same period as that of the modulation signal as shown in FIG. 17 and integrating the hatched portions, a positive, zero or negative signal can be obtained for the respective a, b or c in FIG. 16. The signal is amplified by the amplifier 60 and reaches the servomechanism 61, which then drives the actuator 62. Therefore, the cylindrical resonant cavities 5 and 5' rise, stop or lower according to the positive, zero or negative signal, so that the resonant cavity 5 is automatically controlled to be always resonant with the incoming constant frequency from filter 57. Thus the distance $\Delta x$ between the metal body 6 and the cylindrical resonant cavity 5, which is in a constant relation to said frequency, can be kept constant. Of course, the microwaves enter the cylindrical resonant cavity 5 at the period corresponding to the saw tooth modulation frequency. It is therefore necessary to retain the phase-detected output until the succeeding microwave signal arrives. In practice, the time interval can be made sufficiently small for the measuring purpose.

The microwaves sent from the frequency modulation circuit 56 to the cylindrical resonant cavity 5' vary in frequency to the saw tooth wave. When the cylindrical resonant cavity 5' resonates with a microwave frequency, the output of the phase-detecting circuit 59' is zero just as in the case of the resonant cavity 5. The microwave frequency at the time should be measured. The frequency can be measured directly by a conventional ordinary means or by the power voltage measurement by means of the circuit 63 when the cylindrical resonant cavity 5' resonates. The distance $\Delta x'$ between the metal body 6 and the cylindrical resonant cavity 5' can be determined from the resonant frequency. The operating and indicating unit 64 is used to calculate the thickness D of the metal body 6 according to the Formula $D=L-(\Delta x+\Delta x')$. The distance L is a predetermined value, and the distance $\Delta x$ also is automatically controlled to be constant. Therefore, $L-\Delta x$ can be treated as a constant K. Hence the thickness D to be worked out by the unit 64 is expressed as $D=K-\Delta x'$.

The one-end-open cylindrical resonant cavities used in the above described system are equipped with choke flanges for the prevention of microwave leakage. However, the resonant cavites can be replaced by flangeless one-end-open cylindrical resonant cavities. As the servomechanism, an electric, pneumatic or hydraulic mechanism or a combination thereof may be employed according to the variation in thickness of the metal body under study with time, the period of the vertical motion of the metal body, and so on. The microwave oscillator may be any type of oscillator the oscillation frequency of which is variable over the range of the resonant cavities 5 and 5'. However, a klystron, a magnetron, a backward tube oscillator, a semiconductor oscillator or the like is especially suitable for the purpose. The distance L can be adequately adjusted according to the thickness D.

In the exemplary system shown in FIG. 15, the distance $\Delta x$ is subjected to automatic control to remain constant. Therefore, the desired measurement can be accomplished by measuring the resonance frequency of the cylindrical resonant cavity 5' while causing the resonant cavity 5 to produce a discriminating signal which varies according to whether the resonant cavity is at the resonance point or not. It is therefore not necessary to match the frequency characteristics of both cylindrical resonant cavities. Since the distances L and $\Delta x$ are constant, only the subtraction $K-\Delta x'$ is required; that is no multiplication or division is necessary. Thus the measurement of the thickness of the metal body under study can be carried out swiftly with much ease and high accuracy. In addition, the variation of the thickness can be detected very quickly.

Figures 18, 19:
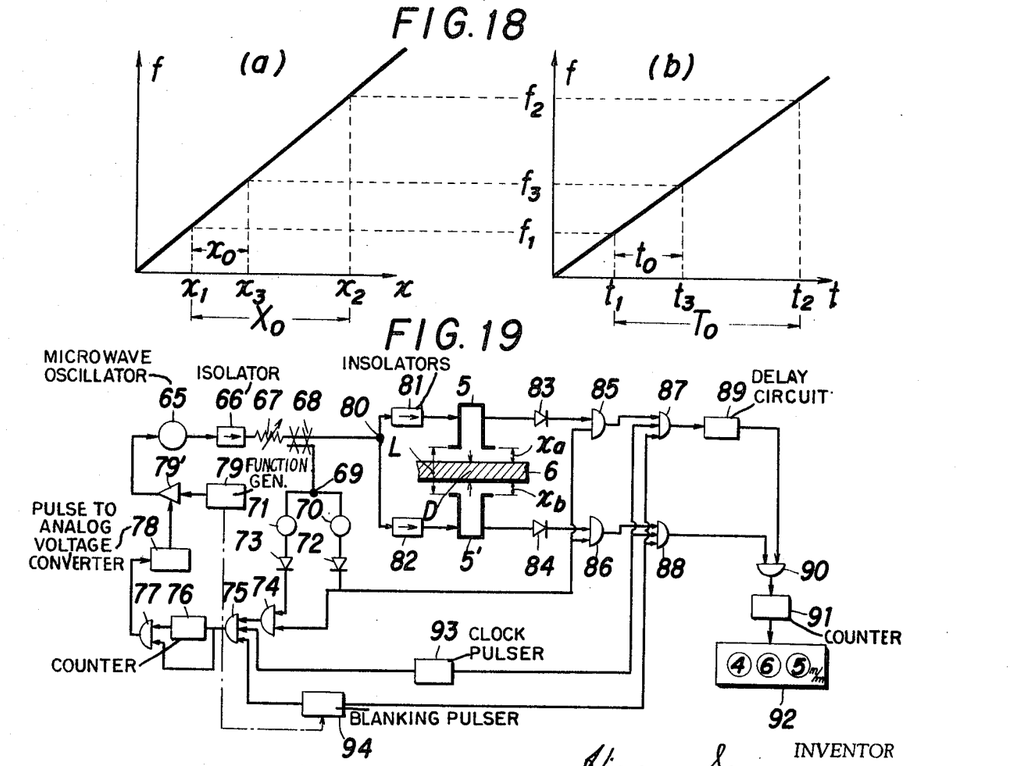
FIG. 19 shows an exemplary measuring arrangement for practice of the technique illustrated in FIG. 18.

FIGS. 18 and 19 illustrate the formation and operation of still another exemplary improved system designed for measuring the thickness of a metal plate according to the present invention. The principle for the system will be described by referring to FIG. 18. As already stated in conjunction with FIG. 4, the distance between the open end of the cylindrical resonant cavity 5 or 5' and the metal body 6 is in rectilinear relationship with the resonant frequency of the microwave power applied to the resonant cavity. The rectilinear relation is shown also in the graph (a) of FIG. 18, where "x" and "f" denote the said distance and frequency respectively. When the microwave frequency "f" is made to vary rectilinearly with time "t," the rectilinear relation results in the graph b of FIG. 18.

Two distance values $x_1$ and $x_2$ are optionally given in the graph a so as to be respectively smaller and larger than the value $x_3$ to be measured ($x_1 < x_3 < x_2$). In the graph b, the frequencies $f_1$, $f_2$ and $f_3$ correspond to the distances $x_1$, $x_2$ and $x_3$ taken in the graph a, while the times at which the frequencies $f_1$, $f_2$ and $f_3$ exist are represented by $t_1$, $t_2$ and $t_3$. As is apparent from a comparison between the graphs a and b, the distances $x_1$, $x_2$ and $x_3$ correspond to the times $t_1$, $t_2$ and $t_3$. Accordingly, the relation between distance $x_3$ and time $t$ can be expressed through the frequency $f_3$ as follows:

$$\frac{x_3-x_1}{x_2-x_1}=\frac{t_3-t_1}{t_2-t_1}$$

or $$x_0 = \frac{X_0}{T_0} t_0$$

where $$x_0 = x_3 - x_1, \quad t_0 = t_3 - t_1$$

$$X_0 = x_2 - x_1, \quad T_0 = t_2 - t_1$$

Since $x_1$ and $x_2$ are given, $X_0$ has a known value and $T_0$ is also known from the relation present between frequency $f$ and time $t$. Therefore, the ratio $X_0/T_0$ has a known value. Hence $x_0$ can be obtained by measuring the time $t_0$. Of course, the value to be worked out is $$x_3 = (x_0 + x_1)$$

which can be obtained by adding the known value $x_1$ to $x_0$. If $x_1$ is selected to be zero, $x_3$ equals $x_0$, so that the value $x_3$ can be found directly from the relation $$x_0 = (X_0/T_0) t_0$$

In the present embodiment of the invention, the above-mentioned procedure of combining the $f$–$x$ and $f$–$t$ graphs and utilizing the relation $x_0 = (X_0/T_0) t_0$ is further simplified on the basis of a study made for the present invention, to such an extent that neither the division $X_0/T_0$ nor the multiplication $(X_0/T_0) t_0$ is necessary in actual practice. This can be attained by effecting an automatic control to maintain the relation $X_0/T_0 = 10^\alpha$ where $\alpha$ is an integer Then the desired measurement can be accomplished by measuring the time $t_0$ digitally and expressing the distance $x_0$ in a digital or analogue display. When the above-mentioned relation holds, what is necessary in practice is only to shift the decimal point, so that no multiplication or division is required. For actual measurements based on the above stated principle, various instrumental systems are available. The arrangement shown in FIG. 19 is an example thereof.

FIG. 19 is a circuit diagram showing a system for working out the thickness D by measuring the distances $x_a$ and $x_b$. The output of a microwave oscillator 65 is modulated by a function generator 79 so that the oscillation frequency varies rectilinearly with time. The microwave output passes through an isolator 66 and is attenuated to an adequate intensity by a variable attenuator 67 and then halved by a directional coupler 68. One of the branched outputs is further divided by another directional coupler 69 into two parts, which are led to a pair of reaction type microwave frequency measurement resonant cavities 70 and 71.

The frequency measurement resonant cavities 70 and 71 are respectively used to determine $x_1$ and $x_2$ which are shown in FIG. 18. The outputs of both cavities 70 and 71 enter detectors 72 and 73 respectively, and the output pulses are fed to a gate circuit 74, which therefore gives forth signal pulse to open a gate circuit 75 only during the duration of the two pulses. Meanwhile, the gate circuit 75 receives, besides the pulses from the gate circuit 74, blanking pulses from the pulser 94 and clock pulses from 93. Thus the pulse recurrence rate at the output of the gate circuit 75 is proportional to $X_0$ determined by the frequency resonant cavities 70 and 71. A preset counter 76 is used to set up the relation $X_0/T_0 = 10^\alpha$. (For example, when $X_0 = 5$ mm., the counter works out $5 \times 10^2$). A gate circuit 77 compares the number of the pulses from the gate circuit 75 with that of the output pulses of the preset counter 76 and generates pulses corresponding to the difference. A circuit 78 changes the pulses into analog voltage, which controls the gain of a wave form amplifier 79′, so that $X_0/T_0$ is automatically controlled to be always $10^\alpha$.

Another method to control $X_0/T_0 = 10^\alpha$ ($\alpha$: integer) is attained by using a voltage controlled oscillator instead of the ordinary pulse generator 93 in FIG. 19 and feeding the error signal of 78 back to the voltage controlled oscillator so as to obtain a zero error signal at the output of the D/A converter 78.

Under such conditions, the other branched part of the microwave output of the directional coupler 68 is divided by a directional coupler 80 into two parts, which pass through isolators 81 and 82 respectively and reach one-end-open cylindrical reaction type resonant cavities 5 and 5′ having the same characteristics. Since the microwave frequency changes rectilinearly with time, only the resonant frequency components corresponding to the distances $x_a$ and $x_b$ enter detectors 83 and 84. Gate circuits 85 and 86 are opened by the output of the detector 72 used to determine $x_1$ and closed by the pulses from the detectors 83 and 84 respectively. Gate circuits 87 and 88 count the clock pulses during the duration of the above-mentioned gate open condition and receive blanking pulses so as not to operate during the pulse return of function generator 79. The pulses from the gate circuit 85 are delayed about a half period of the clock pulse by a delay circuit 89 and pass through a gate circuit 90 and are counted together with the output pulses of the circuit 88. This counted pulse number corresponds to $(t_0 + t_0') \times 10^\alpha$, which stands for $D = L - (x_a + x_b)$, where $t_0$ and $t_0'$ correspond to $x_a$ and $x_b$ respectively. A counter 91 works according to the formula $D = L - (t_0 + t_0') \times 10^\alpha$, and the result is displayed by an indicator 92.

In the above described exemplary system, the measurement of the thickness of a metal body is to be carried out, and therefore the detection of $x_a$ and $x_b$ is required. However, if the purpose of the measurement is only to know the surface configuration of the metal body, it is of course possible to remove the devices 80, 82, 5′, 84, 86, 88, 89 and 90 from the system. Instead of the clock pulses used in the system to control the setting-up of the relation $X_0/T_0 = 10^\alpha$, a reference voltage can be made available for $X_0/T_0$ to be always equal to $10^\alpha$ (volts) where $\alpha$ is an integer. It is also possible to replace the devices 87 to 92 with an analogue computer. By using one of these alternative devices, a variation of the clock pulses or a drift in the reference voltage or the signal period of the function generator 79 can be automatically calibrated through the operation of the microwave resonant cavities 70 and 71.

Since, in the present exemplary system, the microwave oscillation is made to vary rectilinearly with time and the rectilinear relation is combined with the rectilinear $f$–$x$ relation of the cylindrical resonant cavities, with the resultant proportional relationship between distance and time, time measurement and extremely simple computations are sufficient to obtain the spacing distances to be measured. Of course, the metal body under study can be subjected to measurement with high accuracy in an untouched state. Moreover, since a control is effected in such a way that $X_0/T_0$ equals $10^\alpha$ where $\alpha$ is an integer, no multiplication or division is necessary, and what is required is only to shift a decimal point. Therefore, the computing equipment is greatly simplified.

As apparent from the foregoing description of the embodiments, the present invention provides the method of spacing a one-end-open cylindrical resonant cavity from a metal body under study with the one end facing the latter and measuring the resonance frequency of the resonant cavity in order to know the distance between the metal body and the resonant cavity, which has a fixed relation to the resonant frequency, so that the metal body can be subjected to configuration measurement in an untouched state. Therefore, such conditions that the metal body under study is hot and thin never hinder the intended measurement. Since the method can employ an electric measuring means, the time needed for the measurement is exceedingly short. Thus, even when the metal body under study is moving at a high speed, the configuration of the metal body which varies with time can be detected continuously. The method is especially effective to ascertain the variation in the configuration of the metal body due to fine vibration. The configuration measuring range can be made very wide by adequately selecting a microwave frequency according to the configuration to be examined. Since the relation between spacing distance $\Delta x$ and resonance frequency $f$ has been found to be rectilinear, it is possible to find the distance $\Delta x$ with a very high accuracy. That is, the measuring means available in the method is exceptionally high in accuracy as compared with other conventional means.

It is also to be noted that the thickness or surface configuration of a metal body can be worked out with high accuracy in a swift and simple manner by spacing one-end-open cylindrical resonant cavities from opposite sides of a metal body with the open ends facing the metal body, so as to detect the spacing distances $\Delta x_a$ and $\Delta x_b$ and subtracting the sum of both distances from the distance between the open ends of the cylindrical resonant cavities.

What is claimed is:

1. A method for measuring the configuration of a running metal body without contacting it with any measuring equipment, which comprises the steps as directing the open end of at least one one-end-open cylindrical resonant cavity toward at least one surface of the running metal body while keeping said open end spaced from the surface of the body, applying microwaves to said cylindrical resonant cavity, detecting the frequency of the applied microwave at which the cavity is resonant, and from the detected frequency determining the spacing between said running metal body and the end of said cylindrical resonant cavity from the known relationship between said frequency and the spacing.

2. A method according to claim 1 wherein a plurality of one-end-open cylindrical resonant cavities are placed across one surface of the metal body in a row in the direction of the width of the metal body.

3. A method according to claim 1 further comprising moving the cylindrical resonant cavity in the direction of the width of the metal body, whereby the surface configuration transverse to the length can be determined.

4. A method according to claim 1 wherein a plurality of one-end-open cylindrical resonant cavities are placed on opposite sides of the metal body under study and opposed to each other, and combining the distances of the cavities from the metal body and the distance between the opposed cavities to determine the thickness of the body.

5. A method of measuring the thickness of a running metal body without contacting it with any measuring equipment, comprising the steps of directing the open ends of a pair of mechanically interlocked one-end-open cylindrical resonant cavities toward opposite surfaces of the running metal body at positions opposed to each other while keeping said open ends spaced from the surface of the body, applying microwaves of the same frequency to both cavities, discriminating between the outputs of the two resonant cavities, using the difference between the outputs for driving the interlocked cavities transversely of the thickness of the running metal body in a direction to reduce the difference between the outputs, when the difference between the outputs is zero, detecting the frequency at which the cavities are resonant, from the detected frequency determining the spacing between the running body and the ends of the resonant cavities from the known relationship between the frequency and the spacing, and combining the spacing and the distance between the opposed ends of the cavities to determine the thickness of the running metal body.

6. A method of measuring the thickness of a running metal body without contacting it with any measuring equipment, comprising the steps of directing the open ends of a pair of mechanically interlocked one-end-open cylindrical resonant cavities toward opposite surfaces of the running metal body at positions opposed to each other while keeping said open ends spaced from the surface of the body, applying microwaves to one of said cavities, comparing the output of the one cavity with a predetermined value, using the difference between the output and the predetermined value for driving the interlocked cavities transversely of the thickness of the running metal body in a direction to reduce the difference to zero, whereby when the difference reaches zero the one cavity is at a predetermined distance from one surface of the running body, then applying microwaves to the other cavity and detecting the frequency at which the other cavity is resonant, from the detected frequency determining the spacing between the running body and the end of said other cavity from the known relationship between the frequency and the spacing, and combining the spacings and the distance between the opposed ends of the cavities to determine the thickness of the running metal body.

7. A method for measuring the distance between a one-end-open cylindrical resonant cavity and a metal body, which comprises directing the open end of the cylindrical resonant cavity toward the metal body while keeping the open end spaced from the surface of the body, applying to the cylindrical resonant cavity a microwave power varying in frequency in a rectilinear relationship with time, and determining the spacing between the resonant cavity and the surface of the body from the formula $(X_0/T_0)t_0$, wherein $X_0$ is the difference between known spacings $x_1$ and $x_2$ between which the distance to be measured lies and $T_0$ is the difference between times $t_1$ and $t_2$ when the microwave power reaches microwave resonance frequencies $f_1$ and $f_2$ at spacings $x_1$ and $x_2$, by the step of measuring the time $t_0$ from the time $t_1$ for the resonant cavity to resonate as the microwave power is applied thereto.

8. A method as claimed in claim 7 in which the microwave power is controlled so as to keep the ratio $X_0/T_0$ always equal to $10^\alpha$, where $\alpha$ is an integer, whereby the spacing can be obtained according to the expression $t_0 \times 10^\alpha$.

References Cited
UNITED STATES PATENTS

| | | | |
|---|---|---|---|
| 2,421,933 | 6/1947 | Goldstine | 324—58.5 X |
| 2,580,968 | 1/1952 | Sproull | 324—58.5 X |
| 2,640,190 | 5/1953 | Rines. | |
| 2,819,453 | 1/1958 | Cohn | 324—58 X |
| 3,117,276 | 1/1964 | Beyer et al. | 324—58.5 |

OTHER REFERENCES

Enslin, "A Method of Using Microwaves for Measuring Small Displacements, and a Torque Meter Using this Principle," Proceeding of the IEE, vol. 101, No. 83, pp. 522–528, (October 1954).

EDWARD E. KUBASIEWICZ, Primary Examiner